J. W. KENNEDY.
HOSE-COUPLING.
No. 179,923.      Patented July 18, 1876.
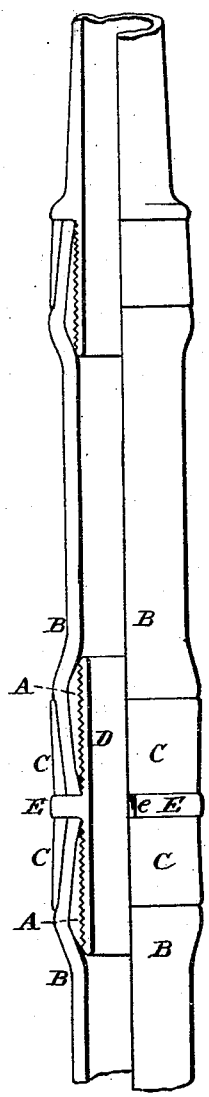
Witnesses:
William Steinhoff
Joseph W. Givens
Inventor:
Josiah W. Kennedy

UNITED STATES PATENT OFFICE.

JOSIAH W. KENNEDY, OF ST. LOUIS, MISSOURI.

IMPROVEMENT IN HOSE-COUPLINGS.

Specification forming part of Letters Patent No. 179,923, dated July 18, 1876; application filed June 15, 1876.

*To all whom it may concern:*

Be it known that I, JOSIAH W. KENNEDY, of St. Louis, in the county of St. Louis and State of Missouri, have invented a certain Improved Hose-Coupling, of which the following is a specification:

This invention is an improvement on the subject-matter of Patent No. 150,764, granted me May 12, 1874, for improvement in hose-couplings; and consists in forming the internal tube-sections of said patent in one piece, on one side of which is a right-hand thread, and on the other a left-hand thread, and having a central raised rim, by which it is turned, and against which the ends of the sleeves on the outside of the hose abut, so that when the said tube-section is turned it screws into the triangular internal sleeves and draws them together, and firmly clamps the hose between them and the sleeves on the outside of the hose.

This form of coupling is very useful in forming joints that do not require to be again uncoupled, as in patching or joining pieces of hose together, in mending hose that has been cut or broken, &c.

The drawing represents my invention half in axial action and half in side view, the hose being shown attached to a nozzle by the improved construction already patented to me.

A A are annular rims of a triangular section, preferably, which are slipped into the adjacent ends B of the hose. C C are sleeves, which fit on the outside of the hose ends. D is a tube-section, having a central rim, E, against which the ends of the sleeves C abut, and by which said sleeves are held in position. The rim E may form part of the section D, or may be made separate and be secured thereon by any suitable means. The portions of the tube-section D on each side of rim E are formed, respectively, with a right and left hand screw-thread, so that when the tube D is turned it screws into the annular rims A, drawing them together, and firmly clamping the hose between them and the external sleeves C. The rim E may be made hexagonal or provided with a notch, *e*, so as to allow its being turned with a wrench or spanner.

This form of coupling is very useful in mending hose that has been accidentally cut or ruptured, and in forming joints that do not require to be uncoupled; and in the drawing I have shown it applied to a hose near to the nozzle, which is secured to the hose in the manner already patented to me.

I claim as my invention—

The combination of the rims A, sleeves C, and right and left hand screw-threaded tube-section D with the hose B, substantially as set forth.

JOSIAH W. KENNEDY.

Witnesses:
 WILLIAM STEINHOFF,
 JOSEPH W. GIVENS.